3,333,020
METAL SALTS OF PHENOLS AS INHIBITORS FOR UNSATURATED POLYESTER RESIN
Jeremiah Mark Howald, Perrysburg, Ohio, assignor to American Cyanamid Company, Stamford, Conn., a corporation of Maine
No Drawing. Original application Mar. 14, 1963, Ser. No. 265,028. Divided and this application Mar. 21, 1966, Ser. No. 535,665
9 Claims. (Cl. 260—863)

ABSTRACT OF THE DISCLOSURE

A polymerizable unsaturated polyester resin composition containing a polymerizable monomer and as an inhibitor against premature gelation of the polyester resin composition certain small quantities of lithium or calcium salts of a phenol.

---

This application is a division of my earlier application having the Ser. No. 265,028, filed Mar. 14, 1963, entitled, "Salts and Compositions Containing the Same."

This invention relates to the use of metal salts of phenols as stabilizers against premature gelation of a polyester resin composition comprising a mixture of (1) a polyester resin prepared by reacting an $\alpha,\beta$-ethylenically unsaturated dicarboxylic acid and a dihydric alcohol and (2) a polymerizable monomer containing a $CH=CH<$ group wherein said polymerizable monomer has a boiling point of at least 60° C. at atmospheric pressure.

An object of the present invention is to stabilize polyester resin compositions against premature gelation by the addition thereto of a metal salt of a phenol wherein the polyester resin composition is comprised of a mixture of (1) an unsaturated polyester resin prepared by reacting an $\alpha,\beta$-ethylenically unsaturated dicarboxylic acid and a dihydric alcohol and (2) a polymerizable monomer containing a $CH_2=CH<$ group and having a boiling point of at least 60° C. This and other objects of the present invention will be discussed in greater detail hereinbelow The lithium salts of phenols used in the present invention may be prepared by reacting lithium alcoholates with a phenolic compound. These phenolic compounds may be monohydric or polyhydric phenols. Still further, these phenolic compounds may be either substituted or unsubstituted. If substituted, the phenol may have on its ring such substituents as halo groups and, more particlarly, chloro, bromo, and iodo groups and/or alkyl groups such as a methyl, ethyl, propyl, isopropyl, n-butyl, isobutyl, tertiary butyl, and the like. Among the phenols which may be used to prepare the lithium salts of the present invention are phenol per se, o-, m-, or p-cresol, hydroquinone, 2,5-ditertiarybutyl hydroquinone, 1-naphthol, 2-naphthol, 2,4-dichlorophenol, pentachlorophenol, p,p'-biphenol, tertiarybutyl-p-cresol, 2,6-ditertiarybutyl-p-cresol, resorcinol, and the like.

In the preparation of the lithium salts of the phenols used in the present invention, one reacts lithium alcoholate with a predetermined quantity of the phenol depending on the number of hydroxy groups in the phenol and depending on the measure of salt formation desired when using polyhydric phenols. When a monohydric phenol is reacted with lithium alcoholate at least about one mole of the phenol is used per mole of lithium alcoholate, whereas one may use one mole of a dihydric phenol per mole of lithium alcoholate to produce a partial salt formation, or one mole of the dihydric phenol per two moles of lithium alcoholate where full salt formation is desired. Similarly, with trihydric, tetrahydric and hexahydric phenols larger quantities of lithium alcoholate are used on a mole basis if full or substantially full salt formation is desired.

In order that the concept of the process of making the lithium salts used in the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example A

One-tenth of a mole of metallic lithium (0.694 part) is reacted with 39.6 parts of methanol to form a solution of lithium methylate in methanol. To this solution is added 0.1 mole of o-cresol (10.8 parts) and the two are blended together. The methanol solvent is removed by distillation, leaving the solid lithium salt of o-cresol.

Example B

Example A is repeated in substantially all details except that in the place of the o-cresol there is substituted an equivalent amount of m-cresol.

Example C

Example A is repeated in substantially all details except that in the place of the o-cresol there is substituted an equivalent amount of p-cresol.

Example D

One-tenth of a mole of p,p'-biphenol (18.6 parts) is added to one-tenth of a mole of lithium methoxide in 39.5 parts of methanol. After removal of the methanol solvent, there remains the mono lithium salt of p,p'-biphenol.

Example E

Five hundredths of a mole of p,p'-biphenol (9.3 parts) is reacted with 0.1 mole of lithium methylate to produce the di-lithium salt of p,p'-biphenol.

Example F

After reacting 0.1 mole of metallic lithium (0.694 part) with 59.4 parts of methanol, 0.1 mole of 2,6-ditertiarybutyl-p-cresol is added and the mixture is refluxed for one hour for complete reaction. The methanol solvent is removed by distillation to leave the lithium salt of 2,6-ditertiarybutyl-p-cresol.

The lithium salts of phenols are useful in unsaturated polyester resin compositions as stabilizers against premature gelation. In addition to these lithium salts, other metal salts of phenols can be used for the same purpose such as the other alkali metal salts and the alkaline earth metal salts together with other heavy metal salts such as the cupric and cuprous salts, the cobaltous and cobaltic salts among others. The sodium, potassium, calcium, magnesium, strontium salts among others may also be used for this polyester resin composition purpose. More specifically one may use the sodium salt of phenol, the barium salt of phenol, the sodium salt of pentachlorophenol, the cupric salt of pentachlorophenol, the cobaltous salt of pentachlorophenol, the potassium salt of pentachlorophenol, the calcium salt of o-, m-, or p-cresol, the sodium salt of 1-, or 2-naphthol, the mono- or di-potassium salt of p,p'-biphenol, the potassium salt of mono-tertiarybutyl-p-cresol, the sodium or potassium salt of 2,6-ditertiarybutyl-p-cresol, and the like. Obviously, these salts of these phenols may be used either singly or in combination with one another. The amount of the stabilizer used in the resinous composition of the present invention will be within the range of from about 0.02% to about 2% and preferably from about 0.05 to about 1% of the total weight of polymerizable resin binder.

The polyester resin compositions used in the total composition of the present invention are well known in the art as is represented by the U.S. Patents 2,255,313, 2,443,735–41, inclusive, among others, all of which are incorporated herein by reference in order to avoid unnecessary redundancy of parts of the prior art which are already well known and recognized.

The polyester resin per se is prepared by reacting an α,β-ethylenically unsaturated dicarboxylic acid with a polyhydric alcohol and preferably with dihydric alcohols such as the glycols. Illustrative of these α,β-ethylenically unsaturated dicarboxylic acids are maleic, fumaric, itaconic, aconitic, and the like. Wherever available the anhydrides of these acids may be used and these acids and/or their anhydrides may be used either singly or in combination with one another. The polyhydric alcohols that may be used in preparing the polyester resins of the present invention are saturated aliphatic and/or cycloaliphatic alcohols such as ethylene glycol, propylene glycol, diethylene glycol, dipropylene glycol, propanediol-1,3; butanediol-1,4; and the like. These dihydric alcohols may be used either singly or in combination with one another or higher hydroxy containing aliphatic alcohols may be used as glycerol, pentaerythritol, dipentaerythritol, sorbitol, mannitol and the like. The use of the higher hydroxy containing alcohols should be restricted so as to have a preponderant amount of the dihydric alcohol present thereby avoiding any significant cross-linking during the polyester resin preparation. Ordinarily it is conventional to use with the α,β-ethylenically unsaturated dicarboxylic acids other polycarboxylic acids which are free of non-benzoid unsaturation such as phthalic, oxalic, malonic, succinic, glutaric, sebacic, adipic, pimelic, suberic, azelaic, tricarballylic, citric, taric, malic and the like. Wherever available the anhydrides of these acids may be used. These dicarboxylic acids, free of non-benzoid unsaturation and/or their anhydrides may be used either singly or in combination with one another. Reference is made to the U.S. Patent 2,777,828 Day et al. which discloses in considerable detail the conventional amounts of the acids of both classes to be used in these polyester resins as well as the polyhydric alcohols and their amounts. In preparing these polyester resin compositions one generally uses an excess of the polyhydric alcohol amounting to about 10% over and beyond the amount of polyhydric alcohol stoichiometrically calculated to substantially esterify all of the carboxyl groups present in the reaction vessel. Ordinarily the esterification reaction is carried out until the acid number is less than about 55 and preferably between about 5 and 30.

The polyester resin composition is prepared by blending the polyester resin with a polymerizable monomer having a $CH_2=C<$ group and having a boiling point of at least about 60° C. The Day et al. patent referred to hereinabove spells out in significant detail the type of polymerizable monomer which may be advantageously used including the styrene compounds and the allyl compounds. Still further the Day et al. patent outlines the range of proportions which are conventionally used in blending the polyester resin with the polymerizable monomer.

When the polymerizable polyester composition of the present invention is to be used as a molding composition, it is desired to make use of the higher boiling monomers such as those having a boiling point in excess of about 250° C. at atmospheric pressure. This, of course, refers to the allyl compounds of which a substantial plurality of species are available commercially such as diallyl phthalate, diallyl maleate, triallyl cyanurate, triallyl isocyanurate and the like. When polyester resin molding compositions are to be prepared it is generally necessary to make use of one or more inert fillers which are well known in the art and are used commercially for this purpose. Included in the group of inert fillers are powdered calcium carbonate, glass fibers, asbestos fibers, clay and the like. The amount of filler can be varied over a fairly substantial range from 0% in a filler-free composition to about 60–85% by weight based on the total weight of the composition depending on the physical properties of the molding composition desired. Larger amounts such as about 90% of filler by weight same basis should be utilized if a putty or rope-like molding composition is desired.

Additionally as a matter of choice one may use coloring materials such as dyes and/or pigments but in this area the choice of coloring material and its amount is a matter of preference and is in no way an essential part of the composition. In the molding compositions it is frequently very desirable and advantageous to introduce the curing catalyst with or without a promoter for cure into the composition prior to its final packaging as a molding composition. The presence of the metal salts of the phenols will serve to advantage in the presence of the catalyst to maintain a stable composition, i.e., stable against premature gelation and/or cure during shipment and storage under the normal conditions experienced during said shipment and/or storage. These catalysts used in these polyester resin compositions are well known entities in the art and the amounts used are conventional. Illustrative of these catalytic materials are such peroxides as benzoyl peroxide, tertiarybutyl perbenzoate, tertiarybutyl hydroperoxide, ditertiarybutyl hydroperoxide, cumene hydroperoxide, and the like. In the molding compositions of the present invention it is sometimes desirable to make use of a mold lubricant such as a metallic soap and, more specifically, such materials as zinc stearate, zinc oleate, aluminum palmitate, and the like. In order to illustrate the present invention in greater detail, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

A polyester resin is prepared by reacting 2460 parts of dipropylene glycol, 1764 parts of maleic anhydride, and 3 parts of hydroquinone under an atmosphere of carbon dioxide at 230° C. for 2.25 hours, at which time an acid number of about 40 is obtained. 62.8 parts of said polyester resin, 1.57 parts of benzoyl peroxide dissolved in 15.7 parts of diallyl phthalate, 2 parts of aluminum palmitate and 300 parts of ground limestone filler are introduced into a sigma blade mixer and thoroughly blended with varying amounts of a phenol salt stabilizer. The charge is mixed to a uniform putty-like composition.

In order to check the low temperature stability of the composition, small balls of putty weighing approximately 40 grams are placed in an oven at 50° C. with forced air circulation. The samples are considered to be no longer suitable for molding when a small knife blade cannot be pushed through the center of the balls. The property of the finished moldings prepared from the compositions are evaluated by molding small test pieces approximately 2" in diameter and ⅛' in thickness using a 30 second cure in a compression mold maintained at a temperature of about 310° F. to 320° F. under a total pressure of about 150 pounds. Two of the test pieces are weighed, immersed in boiling water for a period of 16 hours, dried and reweighed. The "corrected weight loss" is obtained by subtracting the average loss upon drying of unboiled test pieces from the average loss in weight after boiling and drying of the test pieces immersed in boiling water. The results of these tests with the different kinds and amounts of stabilizers are shown in Table I set forth hereinbelow.

A further series of tests were made for comprative purposes in which a control, a plurality of polyester resins containing conventional stabilizers, are compared with the lithium and other metal salts of various phenols. The results of these tests are shown in Table II.

TABLE I.—EVALUATION OF STABILIZERS

| Sample | Stabilizer | Stabilizer Concentration, Percent of Polymerizable Binder | Stability at 50° C., Hours | Barcol Hardness of Disk Cured 30 sec. | Corrected Weight Loss, Grams |
|---|---|---|---|---|---|
| 0 | None | 0 | 4-8 | 72 | 0.020 |
| 1 | Sodium salt of phenol | 0.20 | 9 | 74 | 0.038 |
| 2 | Barium salt of phenol | 0.20 | 9 | 74 | 0.036 |
| 3 | Dipotassium salt of 2,2'-methylenebis (3,4,6-trichlorophenol) | 0.20 | 10 | 72 | 0.030 |
| 4 | Dipotassium salt of 4,4'-isopropylidene Diphenol | 0.20 | 10 | 71 | 0.030 |
| 5 | Monopotassium salt of t-butyl hydroquinone | 0.20 | 10 | 71 | 0.034 |
| 6 | Dipotassium salt of t-butyl hydroquinone | 0.20 | 10 | 72 | 0.032 |
| 7 | Sodium salt of p-nitrophenol | 0.20 | 12 | 71 | 0.033 |
| 8 | Monolithium salt of di-t-butyl hydroquinone | 0.20 | 12 | 72 | 0.034 |
| 9 | Dilithium salt of di-t-butyl hydroquinone | 0.20 | 12 | 70 | 0.038 |
| 10 | Cupric salt of di-t-butyl-p-cresol | 0.20 | 12 | 70 | 0.030 |
| 11 | Calcium salt of dinitrophenol | 0.20 | 12 | 72 | 0.030 |
| 12 | Calcium salt of salicylic acid | 0.20 | 12 | 72 | 0.029 |
| 13 | Aluminum salt of m-cresol | 0.20 | 12 | 72 | 0.034 |
| 14 | Zinc salt of thymol | 0.20 | 12 | 70 | 0.032 |
| 15 | Cupric salt of pentachlorophenol | 0.20 | 12 | 73 | 0.046 |
| 16 | Cuprous salt of pentachlorophenol | 0.20 | 12 | 73 | 0.030 |
| 17 | Cobaltous salt of pentachlorophenol | 0.20 | 12 | 73 | 0.030 |
| 18 | Lithium salt of 2,4-dichlorophenol | 0.20 | 12 | 72 | 0.032 |
| 19 | Sodium salt of nitrosoresorcinol | 0.20 | 14 | 72 | 0.028 |
| 20 | Sodium salt of salicylic acid | 0.20 | 14 | 75 | 0.030 |
| 21 | Calcium salt of o-cresol | 0.15 | 15 | 72 | 0.031 |
| 22 | Calcium salt of m-cresol | 0.15 | 15 | 72 | 0.031 |
| 23 | Calcium salt of p-cresol | 0.15 | 15 | 72 | 0.024 |
| 24 | Calcium salt of hydroquinone | 0.20 | 15 | 70 | 0.026 |
| 25 | Sodium salt of pentachlorophenol | 0.20 | 16 | 72 | 0.034 |
| 26 | Dilithium salt of hydroquinone | 0.20 | 16 | 73 | 0.034 |
| 27 | Dilithium salt of 4,4' (bis-2,6-di-t-butylphenol) | 0.20 | 16 | 72 | 0.036 |
| 28 | Potassium salt of p-cresol | 0.20 | 24 | 71 | 0.035 |
| 29 | Sodium salt of 1-naphthol | 0.20 | 24 | 73 | 0.030 |
| 30 | Sodium salt of 2-naphthol | 0.20 | 24 | 72 | 0.043 |
| 31 | Potassium salt of p,p'-biphenol | 0.20 | 24 | 72 | 0.035 |
| 32 | Dipotassium salt of p,p'-biphenol | 0.20 | 24 | 73 | 0.031 |
| 33 | Potassium salt of t-butyl-p-cresol | 0.20 | 24 | 70 | 0.039 |
| 34 | Dilithium salt of p,p'-biphenol | 0.20 | 28 | 73 | |
| 35 | Potassium salt of di-t-butyl-p-cresol | 0.05 | 40 | 71 | 0.020 |
| 36 | Sodium salt of di-t-butyl-p-cresol | 0.10 | 40 | 73 | 0.031 |
| 37 | Sodium salt of p-nitrosophenol | 0.10 | 40 | 72 | 0.031 |
| 38 | ....do | 0.20 | 40 | 72 | 0.031 |
| 39 | Lithium salt of p-cresol | 0.20 | 40 | 72 | 0.026 |
| 40 | Potassium salt of di-t-butyl-p-cresol | 0.10 | 44 | 72 | 0.022 |
| 41 | ....do | 0.20 | 48-80 | 70 | 0.028 |
| 42 | Sodium salt of di-t-butyl-p-cresol | 0.15 | 48 | 73 | 0.035 |
| 43 | ....do | 0.20 | 48-54 | 72 | 0.035 |
| 44 | Lithium salt of di-t-butyl-p-cresol | 0.20 | 48 | 71 | 0.036 |
| 45 | Lithium salt of o-cresol | 0.20 | 48 | 73 | 0.035 |
| 46 | Lithium salt of m-cresol | 0.20 | 48 | 71 | 0.051 |

TABLE II

| Sample | | Stability at 50° C., Hours | Barcol Hardness of 30 sec. Cure | Corrected Weight Loss, Grams |
|---|---|---|---|---|
| A | Nothing Added | 4-8 | 72 | 0.020 |
| B | 0.05% Di-t-butyl-p-cresol | 40 | 70 | 0.026 |
| C | 0.10% Di-t-butyl-p-cresol | 44 | 69 | 0.027 |
| D | 0.20% Di-t-butyl-p-cresol | 48 | 70 | 0.035 |
| E | 0.05% Potassium salt of di-t-butyl-p-cresol | 40 | 71 | 0.020 |
| F | 0.10% Potassium salt of di-t-butyl-p-cresol | 44 | 72 | 0.022 |
| G | 0.20% Potassium salt of di-t-butyl-p-cresol | 48-80 | 70 | 0.027 |
| H | 0.20% Lithium salt of di-t-butyl-p-cresol | 48 | 71 | 0.036 |

I claim:
1. A polymerizable polyester resin composition comprising a mixture of
  (1) a polyester resin prepared by reacting an α,β-ethylenically unsaturated dicarboxylic acid and a dihydric alcohol,
  (2) a polymerizable monomer containing a $CH_2=C<$ group and having a boiling point of at least 60° C. and
  (3) as an inhibitor against premature gelation for (1) and (2), from about 0.02% to about 2%, by weight, based on the total weight of the polymerizable resin binder of a metal salt of a phenol wherein said metal is selected from the group consisting of lithium and calcium.

2. A polymerizable polyester resin composition according to claim 1 in which the polymerizable monomer is a polymerizable allyl monomer.

3. A polymerizable polyester resin composition according to claim 1 in which the polymerizable monomer is diallyl phthalate.

4. A polymerizable polyester resin composition according to claim 3 in which the metal salt is a lithium salt of a phenol.

5. A polymerizable polyester resin composition according to claim 4 in which the phenol is a monohydric phenol.

6. A polymerizable polyester resin composition according to claim 3 in which the metal salt is a calcium salt of ortho-cresol.

7. A polymerizable polyester resin composition according to claim 3 in which the metal salt is a calcium salt of meta-cresol.

8. A polymerizable polyester resin composition according to claim 3 in which the metal salt is a calcium salt of para-cresol.

9. A polymerizable polyester resin composition according to claim 3 in which the metal salt is a lithium salt of ditertiarybutyl-p-cresol.

(References on following page)

References Cited

UNITED STATES PATENTS

| | | | |
|---|---|---|---|
| 2,745,882 | 5/1956 | Hale | 260—624 |
| 2,873,263 | 2/1959 | Lal | 260—863 |
| 2,903,487 | 9/1959 | Coffold | 260—624 |
| 3,061,580 | 10/1962 | Erickson et al. | 260—863 |
| 3,091,936 | 6/1963 | Lundberg et al. | 61—36 |
| 3,098,875 | 7/1963 | Schmerling | 260—624 |

OTHER REFERENCES

Bjorksten: "Polyesters and Their Applications," pages 31, 52, and 53, Reinhold Publishers, 1956.

MURRAY TILLMAN, *Primary Examiner.*

J. T. GOOLKASIAN, *Assistant Examiner.*